(12) United States Patent
Sugiyama

(10) Patent No.: US 7,826,689 B2
(45) Date of Patent: Nov. 2, 2010

(54) OPTICAL DEVICE WHICH OUTPUTS INDEPENDENTLY MODULATED LIGHT BEAMS IN RESPECTIVE TE AND TM POLARIZATION MODES

(75) Inventor: Masaki Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 54 days.

(21) Appl. No.: 12/289,980

(22) Filed: Nov. 7, 2008

(65) Prior Publication Data
US 2009/0238512 A1 Sep. 24, 2009

(30) Foreign Application Priority Data
Mar. 19, 2008 (JP) .............................. 2008-072330

(51) Int. Cl.
*G02F 1/035* (2006.01)
*G02F 1/225* (2006.01)

(52) U.S. Cl. ............................................. 385/2; 385/3

(58) Field of Classification Search ...................... None
See application file for complete search history.

(56) References Cited

U.S. PATENT DOCUMENTS

| 5,654,818 | A | * | 8/1997 | Yao .............................. 359/246 |
| 6,081,360 | A | * | 6/2000 | Ishikawa et al. ............ 398/147 |
| 2004/0184755 | A1 | * | 9/2004 | Sugiyama et al. ........... 385/129 |
| 2005/0213863 | A1 | * | 9/2005 | Sugiyama et al. ............... 385/2 |
| 2007/0206950 | A1 | * | 9/2007 | Liu et al. ..................... 398/115 |
| 2009/0324157 | A1 | * | 12/2009 | Sugiyama ....................... 385/2 |

FOREIGN PATENT DOCUMENTS

JP 7-325276 A * 12/1995
JP 2005-266362 A * 9/2005

OTHER PUBLICATIONS

Patent Abstracts of Japan, Publication No. 2008-046573, published Feb. 28, 2008.
Patent Abstracts of Japan, Publication No. 08-278422, published Oct. 22, 1996.

\* cited by examiner

*Primary Examiner*—Mike Stahl
(74) *Attorney, Agent, or Firm*—Staas & Halsey LLP

(57) ABSTRACT

According to an aspect of an embodiment, an optical device comprising: a first modulator for independently modulating first light having a first predetermined polarization mode; a second modulator for independently modulating second light having a second predetermined polarization mode; and a polarization beam coupler having a first port, a second port, a third port, and a fourth port; the polarization beam coupler for inputting the first light from the first modulator via the first port, inputting the second light from the second modulator via the second port, outputting the first light via the third port and inputting reflected and polarization converted light on the first light by a wave plate and a mirror, and outputting the first light having the converted polarization mode and the second light having the predetermined polarization mode via the fourth port.

20 Claims, 13 Drawing Sheets

OPTICAL DEVICE WHICH OUTPUTS INDEPENDENTLY MODULATED LIGHT BEAMS IN RESPECTIVE TE AND TM POLARIZATION MODES

CROSS-REFERENCE TO RELATED APPLICATIONS

This application is based upon and claims the benefits of priority from the prior Japanese Patent Application No. 2008-072330, filed on Mar. 19, 2008, the entire contents of which are incorporated herein by reference.

BACKGROUND (1) Field

This disclosure relates to an optical device. This disclosure more particularly relates to an optical device with modulators used in optical communication.

(2) Description of the Related Art

In the field of optical communication, optical devices with a Mach-Zehnder interference optical modulator have been developing (see, for example, Japanese Unexamined Patent Publication No. 2008-46573).

Such a modulator included in an optical device is formed by, for example, forming an optical waveguide in an electro-optic crystal substrate and locating electrodes near the optical waveguide. The optical waveguide of the modulator can broadly be divided into an input waveguide where light is input and propagated, a pair of modulation waveguides where the light propagated through the input waveguide is split and propagated, and an output waveguide where the light propagated through the pair of modulation waveguides is combined, propagated, and output. A signal electrode and an earth electrode are located over the pair of modulation waveguides. A method for locating lumped-constant type electrodes or traveling-wave type electrodes as electrodes of a modulator is known. For example, if traveling-wave type electrodes are located, then an end of the signal electrode and an end of the earth electrode are connected via a resistor and a microwave signal is applied from the input side. At this time the refractive index of each of the pair of modulation waveguides changes and the phase of light which is input to the input waveguide and which is propagated through the pair of modulation waveguides changes. Accordingly, intensity-modulated signal light is output from the output waveguide because of Mach-Zehnder interference.

An optical sending apparatus for polarization multiplex communication which includes two modulators each having the above structure is proposed. The polarization modes of signal light output from the optical sending apparatus are, for example, TM mode and TE mode. That is to say, the polarization modes of signal light output from the optical sending apparatus are perpendicular to each other. For example, the following structure is proposed. In order to obtain signal light the polarization modes of which are perpendicular to each other, light output from one of the two modulators is made to pass through a transmission λ/2 plate. In addition, in order to multiplex the signal light the polarization modes of which are perpendicular to each other, a polarization beam coupler (PBC) is located on the end side of two output waveguides.

In addition to a transmission plate, a reflection plate is proposed as a component, such as a λ/2 plate, for converting a polarization mode in the field of optical communication (see, for example, Japanese Unexamined Patent Publication No. 08-278422).

In order to miniaturize the optical device including the above modulators, it is desirable that the two modulators and the PBC should be formed in one substrate for the purpose of forming them in one chip. Accordingly, it is necessary to locate a component, such as the λ/2 plate, for rotating polarization in the chip.

For example, the method of forming a groove in a portion of an output waveguide included in one of the two modulators for cutting the output waveguide and of inserting the λ/2 plate into the groove is known as a method for locating the λ/2 plate in the chip. With this method, however, a plurality of optical device chips are formed on one wafer (electro-optic crystal substrate) and the wafer is cut into the plurality of optical device chips. After that, the above process must be performed on each chip. This requires a large number of steps. In addition, a production yield may deteriorate because of, for example, damage to a chip caused by the formation of the groove. Furthermore, if this method is adopted, a great optical loss occurs in the groove where the λ/2 plate is located, or there is variation in optical loss among chips.

SUMMARY

The present invention was made under the background circumstances described above. An object of the present embodiment is to provide a high performance optical device with high reliability which can be fabricated easily and which is suitable for polarization multiplex communication.

In order to achieve the above object, an optical device comprising a coupler formed on a substrate and having first and second ports and third and fourth ports opposite to the first and second ports, respectively, for outputting first-polarization-mode light input from one port to a port diagonally opposite to the one port and for outputting second-polarization-mode light input from one port to a port opposite to the one port, a first modulator formed on the substrate and including a first optical waveguide connected to the first port for modulating first-polarization-mode light input to the first optical waveguide and for outputting the modulated first-polarization-mode light to the first port, a second modulator formed on the substrate and including a second optical waveguide connected to the third port for modulating first-polarization-mode light input to the second optical waveguide and for outputting the modulated first-polarization-mode light to the third port, and a polarization mode conversion section located on one end of the substrate for converting the first-polarization-mode light which is input from the second modulator to the third port and which is output to the second port diagonally opposite to the third port into second-polarization-mode light and for returning the second-polarization-mode light to the second port is provided.

The above and other objects, features and advantages will become apparent from the following description when taken in conjunction with the accompanying drawings which illustrate preferred embodiments by way of example.

DESCRIPTION OF THE PREFERRED EMBODIMENTS

Embodiments will now be described in detail with reference to the drawings.

A first embodiment will be described first.

Figure 1:
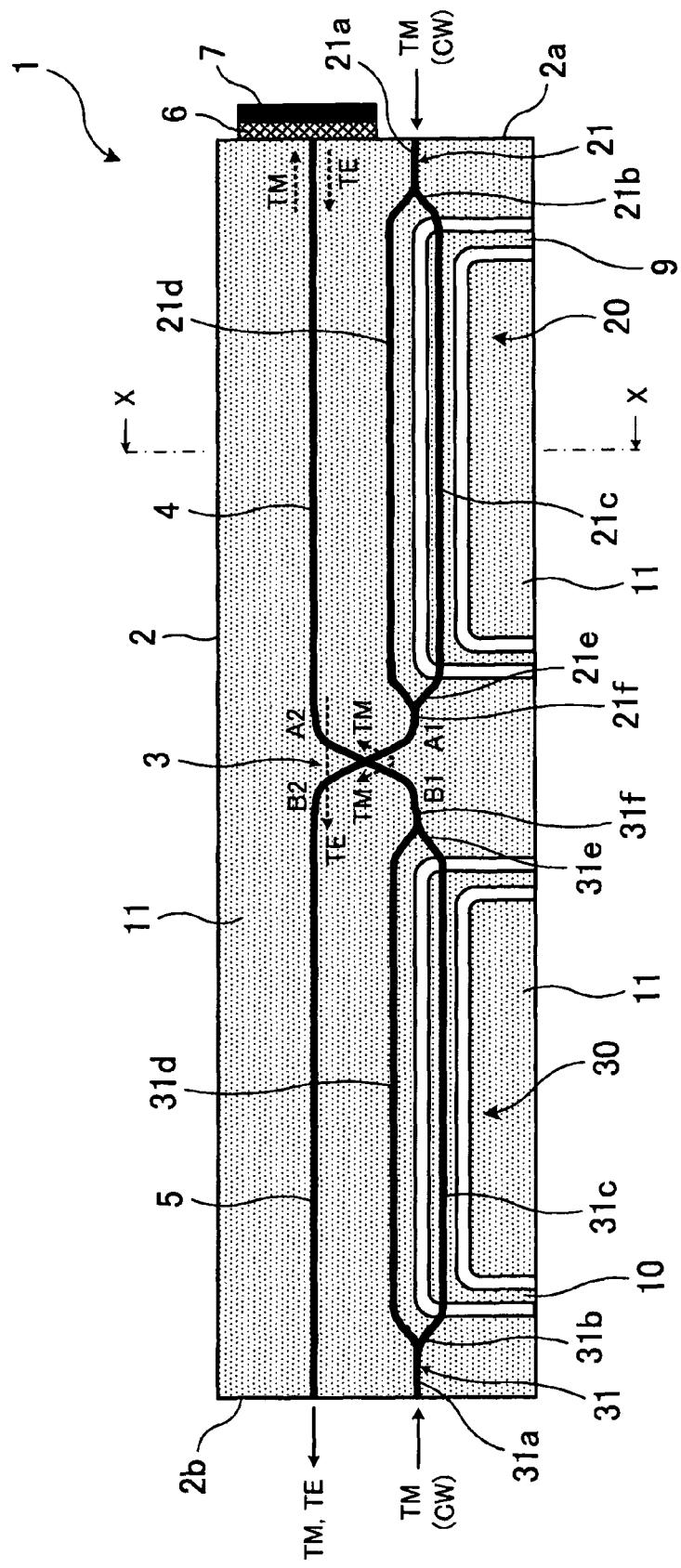
FIG. 1 is a fragmentary schematic plan view showing an example of an optical device according to a first embodiment.
Figure 2:
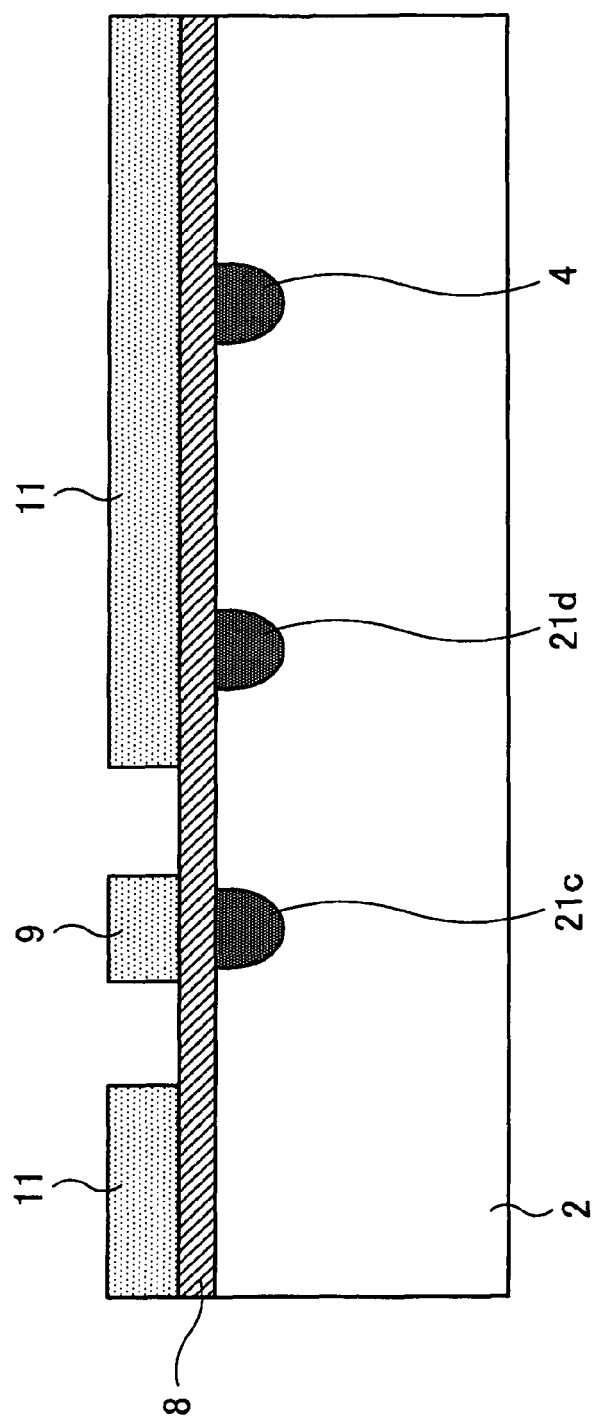
FIG. 2 is a schematic sectional view taken along the line X-X of FIG. 1.

FIG. 1 is a fragmentary schematic plan view showing an example of an optical device according to a first embodiment. FIG. 2 is a schematic sectional view taken along the line X-X of FIG. 1.

An optical device 1 shown in FIG. 1 includes two modulators 20 and 30 for modulating and outputting light input from both ends 2a and 2b.

An electro-optic crystal, such as lithium niobate ($LiNbO_3$) or lithium tantalate ($LiTaO_2$), is used as a substrate 2 in which the modulators 20 and 30 are formed. For example, the substrate 2 obtained by cutting (Z-cutting) $LiNbO_3$ parallel to a z-axis which is the direction of its crystallographic axis is used. The z-cut substrate 2 has a crystallographic axis by which the refractive index can efficiently be changed on the basis of an electro-optic effect in a direction perpendicular to its surface.

An optical waveguide 21 of the modulator 20, an optical waveguide 31 of the modulator 30, a PBC 3, and modulated light propagation waveguides 4 and 5 are formed on the above substrate 2.

The optical waveguides 21 and 31, the PBC 3, and the modulated light propagation waveguides 4 and 5 are formed on waveguide pattern formation regions of the substrate 2 by, for example, forming a metal film of titanium (Ti) or the like and performing thermal diffusion of titanium. The optical waveguides 21 and 31 may be formed by forming such a metal film and making a proton exchange in benzoic acid.

The optical waveguide 21 of the modulator 20 has an input waveguide 21a where light input from the one end 2a of the optical device 1 is propagated, a branching waveguide 21b where the light propagated through the input waveguide 21a is split, and a pair of modulation waveguides 21c and 21d where the split light is propagated. The modulation waveguides 21c and 21d are formed so that they will be, for example, parallel straight lines. In addition, the optical waveguide 21 has a branching waveguide 21e where the light propagated through the modulation waveguides 21c and 21d is combined, and an output waveguide 21f where the combined light is propagated.

Similarly, the optical waveguide 31 of the modulator 30 has an input waveguide 31a where light input from the other end 2b of the optical device 1 is propagated, a branching waveguide 31b where the light propagated through the input waveguide 31a is split, a pair of modulation waveguides 31c and 31d where the split light is propagated, a branching waveguide 31e where the light propagated through the modulation waveguides 31c and 31d is combined, and an output waveguide 31f where the combined light is propagated.

The output waveguides 21f and 31f of the optical waveguides 21 and 31 each having the above structure are connected to ports A1 and B1, respectively, of the 2×2 PBC 3 which are opposite to each other. The modulated light propagation waveguides 4 and 5 are connected to remaining ports A2 and B2, respectively, of the PBC 3 which are opposite to each other.

Figure 3:
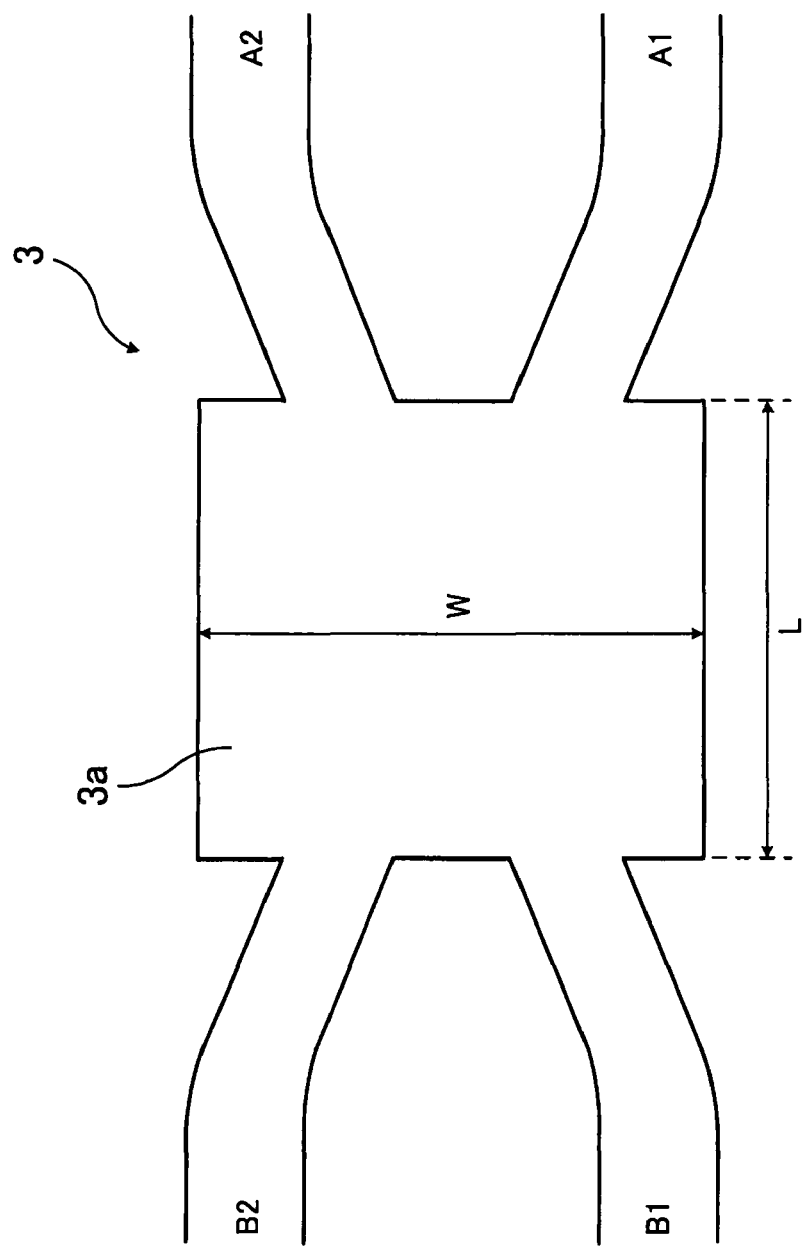
FIG. 3 is a view for describing a PBC.

FIG. 3 is a view for describing the PBC.

The PBC 3 has the four ports A1, A2, B1, and B2 where light can be input or output, and a widened section 3a. All of them can be formed on the substrate 2 in the same way that is used for forming the optical waveguides 21 and 31 and the modulated light propagation waveguides 4 and 5. The output waveguides 21f and 31f are connected to the ports A1 and B1, respectively, of the PBC 3 which are opposite to each other. The modulated light propagation waveguides 4 and 5 are connected to the ports A2 and B2, respectively, of the PBC 3 which are opposite to each other. Width W and length L of the widened section 3a of the PBC 3 are set so that predetermined single-mode light (TM-mode light, in this example) input will pass through ports (A1-B2 or A2-B1) which are diagonally opposite to each other and so that another single-mode light (TE-mode light, in this example) input will pass through ports (A1-B1 or A2-B2) which are opposite to each other.

The modulators 20 and 30 are located symmetrically on the port A1 side and the port B1 side, respectively, with the above PBC 3 between.

The modulated light propagation waveguide 4 connected to the port A2 of the PBC 3 is formed so that it will reach the one end 2a of the substrate 2. A λ/4 plate 6 and a mirror 7 are located at the end of the modulated light propagation waveguide 4 as a polarization mode conversion section. In addition, the modulated light propagation waveguide 5 connected to the port B2 of the PBC 3 is formed so that it will reach the other end 2b of the substrate 2.

For example, the λ/4 plate 6 may be attached to the end 2a with proper glue and the mirror 7 may be attached to the outside of the λ/4 plate 6. Furthermore, a film which functions as the mirror 7 is formed on one side of a film which functions as the λ/4 plate 6 and the other side of the film which functions as the λ/4 plate 6 may be attached to the end 2a.

A buffer layer 8 is formed over an entire surface of the substrate 2 in which the optical waveguides 21 and 31, the PBC 3, and the modulated light propagation waveguides 4 and 5 are formed. For example, a silicon oxide ($SiO_2$) film with a thickness of about 0.2 to 2 μm is used as the buffer layer 8.

Signal electrodes 9 and 10 and an earth electrode 11 each having a predetermined shape are formed on predetermined positions over the substrate 2 with the buffer layer 8 between. A signal source (not shown) which generates an electrical signal (modulation signal) for performing phase modulation in the modulation waveguides 21c, 21d, 31c, and 31d is connected to the signal electrodes 9 and 10. The earth electrode 11 has earth potential. If the z-cut substrate 2 is used, a change in refractive index by a z-direction electric field is used. Therefore, the signal electrodes 9 and 10 are located, for example, right over the modulation waveguides 21c and 31c of the modulators 20 and 30 respectively. In this case, the earth electrode 11 is located right over the modulation waveguides 21d and 31d.

The pattern shape of the signal electrodes 9 and 10 and the earth electrode 11 is not limited to those shown in FIG. 1. For example, the earth electrode 11 may have a pattern shape which does not cover the PBC 3 or the modulated light propagation waveguide 4 or 5. As a result, light absorption by the earth electrode 11 is suppressed and propagation loss of light propagated through each waveguide under the earth electrode 11 can be reduced.

When TM-mode light (CW (continuous wave) light) output from a semiconductor laser or the like is input to the input waveguides 21a and 31a of the modulators 20 and 30 included in the optical device 1 having the above structure, the input light is propagated through the optical waveguides 21 and 31.

In the modulator 20, the TM-mode light input to the input waveguide 21a is split first in the branching waveguide 21b and is propagated to the modulation waveguides 21c and 21d. By applying a predetermined modulation signal to the signal electrode 9 at this time, the refractive index of the modulation waveguides 21c and 21d changes. As a result, the phase of the TM-mode light propagated through the modulation waveguides 21c and 21d changes. A signal applied to the signal electrode 9 is controlled so that a predetermined difference in phase (zero or $\pi$, for example) will be obtained between the TM-mode light propagated through the modulation waveguides 21c and 21d.

The TM-mode light which is propagated through the modulation waveguides 21c and 21d and between which the predetermined difference in phase is obtained is combined in the branching waveguide 21e, is intensity-modulated according to the difference in phase, and is propagated to the output waveguide 21f. Then the TM-mode light after the modulation which is propagated through the output waveguide 21f is input to the port A1 of the PBC 3. In the PBC 3, the TM-mode light input to the port A1 is output to the port B2 diagonally opposite to the port A1. The TM-mode light after the modulation output to the port B2 is propagated through the modulated light propagation waveguide 5 and is output from the end 2b as TM-mode light.

In the modulator 30, on the other hand, the TM-mode light input to the input waveguide 31a is split in the branching waveguide 31b and is propagated to the modulation waveguides 31c and 31d. By applying a predetermined modulation signal to the signal electrode 10 at this time, a predetermined difference in phase is obtained between the TM-mode light propagated through the modulation waveguides 31c and 31d.

The TM-mode light between which the predetermined difference in phase is obtained is combined in the branching waveguide 31e, is intensity-modulated according to the difference in phase, and is propagated to the output waveguide 31f. Then the TM-mode light after the modulation which is propagated through the output waveguide 31f is input to the port B1 of the PBC 3, and is output to the port A2 diagonally opposite to the port B1. The TM-mode light after the modulation which is output to the port A2 is propagated through the modulated light propagation waveguide 4.

When the TM-mode light after the modulation which is propagated through the modulated light propagation waveguide 4 reaches the end 2a, the TM-mode light passes through the λ/4 plate 6 located on the end 2a, is reflected from the mirror 7, passes through the λ/4 plate 6 again, and is returned to the modulated light propagation waveguide 4. That is to say, the TM-mode light after the modulation which is propagated through the modulated light propagation waveguide 4 passes through the λ/4 plate 6 twice. As a result, the TM-mode light after the modulation is converted into TE-mode light.

After that, the TE-mode light is propagated through the modulated light propagation waveguide 4 and input to the port A2 of the PBC 3. In the PBC 3, the TE-mode light input to the port A2 is output to the port B2 opposite to the port A2. The TE-mode light after the modulation which is output to the port B2 is propagated through the modulated light propagation waveguide 5 and is output from the end 2b as TE-mode light.

As a result, the TM-mode light after the modulation and the TE-mode light after the modulation are multiplexed and are output from the end 2b.

With the optical device 1 according to the first embodiment, as has been described, the TM-mode light after the modulation which is output from the two modulators 20 and 30 is input from the ports A1 and B1, respectively, of the PBC 3 opposite to each other and is output to the port B2 diagonally opposite to the port A1 and the port A2 diagonally opposite to the port B1, respectively. Then the TM-mode light output from the modulator 30 is converted into the TE-mode light by the λ/4 plate 6 and the mirror 7 located on the end 2a, passes through the ports A2 and B2 of the PBC 3 opposite to each other, and is output from the end 2b together with the TM-mode light output from the other modulator 20. With the optical device 1, this polarization multiplexing function can be realized by one chip.

An example of the conventional optical device will now be described.

Figure 4:
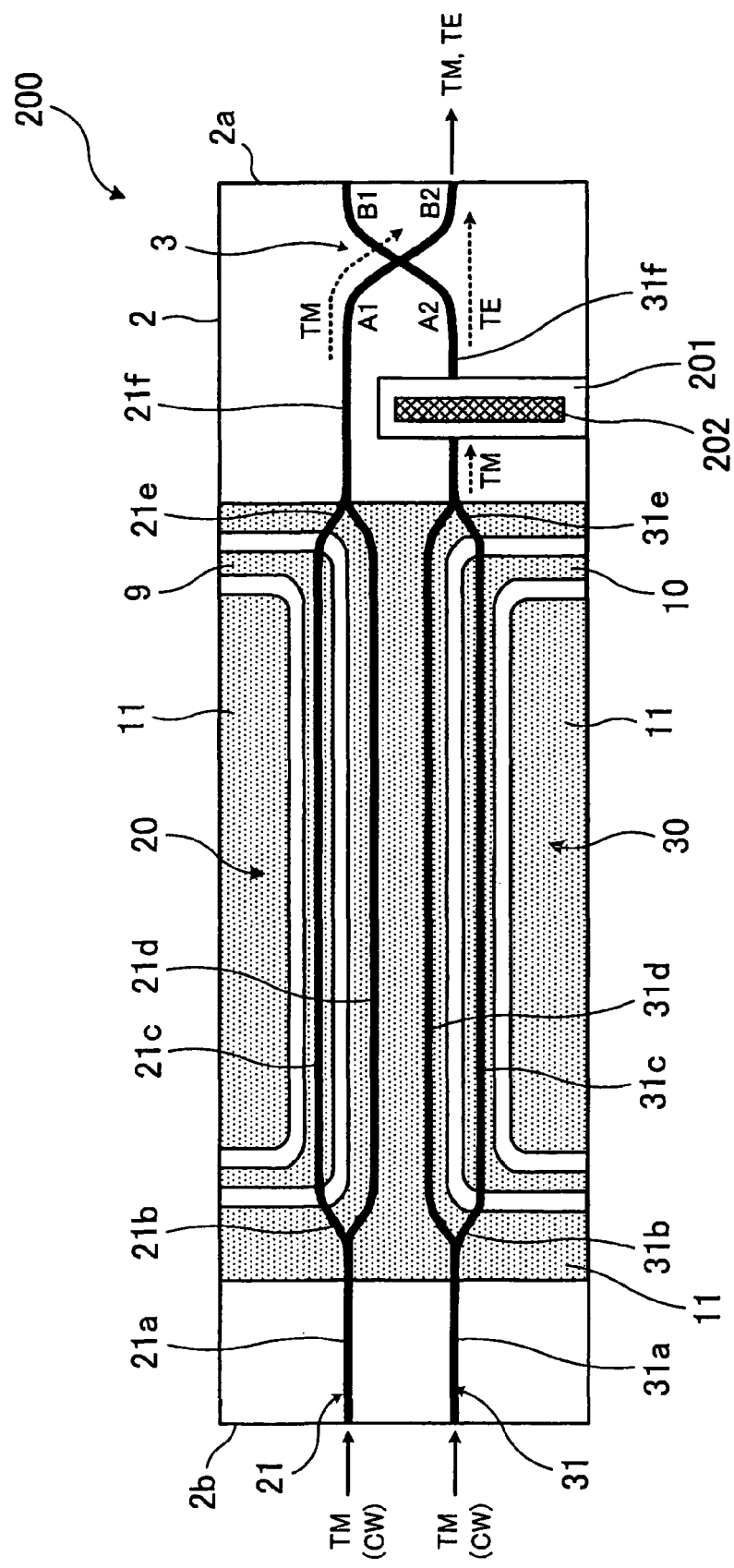
FIG. 4 is a fragmentary schematic plan view showing an example of the conventional optical device.

FIG. 4 is a fragmentary schematic plan view showing an example of the conventional optical device. Components in FIG. 4 that are the same as or equivalent to those shown in FIG. 1 are marked with the same symbols.

With an optical device 200 shown in FIG. 4, TM-mode light (CW light) is input to the side of one end 2b of both modulators 20 and 30 located in parallel. A groove 201 is formed midway along an output waveguide 31f of the modulator 30 and a λ/2 plate 202 is located in the groove 201. A PBC 3 is located at the next stage. An output waveguide 21f of the modulator 20 and the output waveguide 31f of the modulator 30 are connected to ports A1 and A2, respectively, of the PBC 3.

The TM-mode light input to an input waveguide 21a of the modulator 20 is split in a branching waveguide 21b. A signal electrode 9 and an earth electrode 11 are used for obtaining a predetermined difference in phase between the TM-mode light propagated through modulation waveguides 21c and 21d. Then the TM-mode light is combined in a branching waveguide 21e and the intensity-modulated TM-mode light is output from the output waveguide 21f. The TM-mode light output from the modulator 20 is input to the port A1 of the PBC 3 and is output from a port B2 diagonally opposite to the port A1.

Similarly, the TM-mode light input to an input waveguide 31a of the modulator 30 is modulated and is output from the output waveguide 31f as TM-mode light. The TM-mode light output from the modulator 30 passes through the λ/2 plate 202 located in the groove 201 once. As a result, the TM-mode light is converted into TE-mode light, is input to the port A2 of the PBC 3, and is output from the port B2 opposite to the port A2.

The TM-mode light after the modulation and the TE-mode light after the modulation can also be multiplexed and output by the use of the optical device 200 having the above structure.

In this case, however, it is necessary to form the groove 201 which has certain width and depth and into which the λ/2 plate 202 can be inserted midway along the output waveguide 31f in each optical device 200 chip by, for example, cutting after separating a wafer (electro-optic crystal substrate) into individual chips. It is not necessarily easy to form the groove 201 which has predetermined width and depth in this way in an area of the substrate 2. When the groove 201 is formed, the substrate 2 may be damaged. In addition, a layer of air with certain thickness where the λ/2 plate 202 can be inserted or glue or the like for fixing the λ/2 plate 202 in the groove 201 exists between the end of the output waveguide 31f and the λ/2 plate 202. Accordingly, loss of propagated light cannot be neglected. Furthermore, there may be variation in optical loss among individual optical devices 200.

With the above optical device 1 according to the first embodiment, unlike the optical device 200, there is no need to form the groove 201 in each chip, and the λ/4 plate 6 and the mirror 7 can be located on the end 2a. Therefore, it is comparatively easy to form the optical device 1, and loss of propagated light can be reduced effectively. For example, the λ/4 plate 6 and the mirror 7 can be fixed in the following way. A plurality of optical device 1 chips are formed on one wafer and the wafer is cut into the plurality of optical device 1 chips. Then the end 2a where the modulated light propagation waveguide 4 is exposed is formed. The λ/4 plate 6 and the mirror 7 are fixed onto a portion of the end 2a where the modulated light propagation waveguide 4 is exposed by the use of glue or the like.

A second embodiment will now be described.

Figure 5:
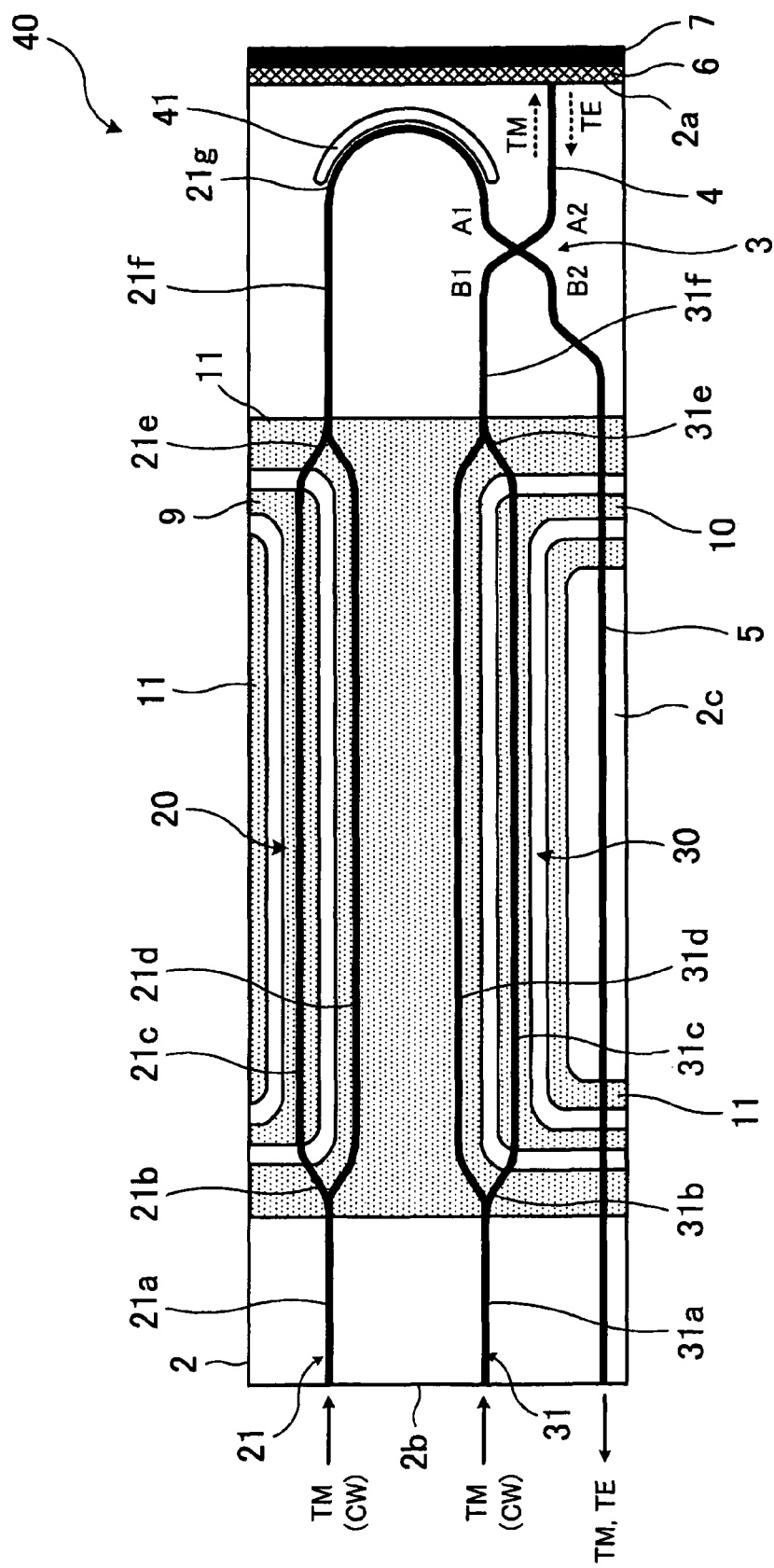
FIG. 5 is a fragmentary schematic plan view showing an example of an optical device according to a second embodiment.

FIG. 5 is a fragmentary schematic plan view showing an example of an optical device according to a second embodiment. Components in FIG. 5 that are the same as or equivalent to those shown in FIG. 1 are marked with the same symbols.

With an optical device 40 shown in FIG. 5, TM-mode light (CW light) is input from a semiconductor laser or the like to the side of an end 2b of both modulators 20 and 30 located in parallel. An optical waveguide 21 has an input waveguide 21a, a branching waveguide 21b, modulation waveguides 21c and 21d, a branching waveguide 21e, and an output waveguide 21f. Similarly, an optical waveguide 31 has an input waveguide 31a, a branching waveguide 31b, modulation waveguides 31c and 31d, a branching waveguide 31e, and an output waveguide 31f.

In addition, the optical device 40 has a bent waveguide 21g connected to the output waveguide 21f of the modulator 20 as part of the optical waveguide 21. TM-mode light output from the output waveguide 21f is returned to the side of the end 2b by the bent waveguide 21g. The bent waveguide 21g can be formed by thermal diffusion of metal, a proton exchange, or the like. This is the same with the other waveguides. A comparatively shallow groove 41 the depth of which is almost the same as that of, for example, the bent waveguide 21g is formed beside the bent waveguide 21g in a substrate 2. By forming the groove 41, the bent waveguide 21g the curvature of which is obtuse and in which a propagation loss is small can be obtained. The bent waveguide 21g having the above structure is connected to a port A1 of a PBC 3.

The output waveguide 31f of the other modulator 30 is connected to a port B1 of the PBC 3 opposite to the port A1. In addition, a modulated light propagation waveguide 4 which reaches an end 2a is connected to a port A2. A λ/4 plate 6 and a mirror 7 are located on, for example, an entire surface of the end 2a. A modulated light propagation waveguide 5 which reaches the end 2b is connected to a port B2.

A buffer layer (not shown) is formed over an entire surface of the substrate 2 in which the optical waveguides 21 and 31, the PBC 3, and the modulated light propagation waveguides 4 and 5 are formed. Signal electrodes 9 and 10 are located right over the modulation waveguides 21c and 31c, respectively, with the buffer layer between and an earth electrode 11 is located right over the modulation waveguides 21d and 31d.

The modulated light propagation waveguide 5 which extends from the port B2 of the PBC 3 to the end 2b is comparatively long, so propagation loss of light may occur. Absorption by an electrode located over the modulated light propagation waveguide 5 has a great influence on optical propagation loss. Accordingly, with the optical device 40 there are regions over the modulated light propagation waveguide 5 where the earth electrode 11 is not formed. As a result, the influence of such absorption is reduced.

In this example, the λ/4 plate 6 and the mirror 7 are located on the entire surface of the end 2a. However, the λ/4 plate 6 and the mirror 7 may be located on a portion of the end 2a so that they will cover the modulated light propagation waveguide 4. In this case, one wafer is cut into a plurality of optical device 40 chips and the λ/4 plate 6 and the mirror 7 are fixed to a predetermined portion of each chip. If the λ/4 plate 6 and the mirror 7 are located on the entire surface of the end 2a as shown in FIG. 5, then the λ/4 plate 6 and the mirror 7 are fixed to the ends 2a of the plurality of chips before cutting the wafer. After that, the wafer should be cut into the plurality of chips each including the λ/4 plate 6 and the mirror 7.

With the optical device 40 having the above structure, TM-mode light input from the side of the end 2b to the input waveguide 21a of the modulator 20 is split in the branching waveguide 21b. The signal electrode 9 and the earth electrode 11 are used for obtaining a predetermined difference in phase between the split TM-mode light propagated through the modulation waveguides 21c and 21d. Then the split TM-mode light is combined in the branching waveguide 21e and is propagated through the output waveguide 21f. The TM-mode light after the modulation is returned to the side of the end 2b by the bent waveguide 21g, is input to the port A1 of the PBC 3, and is output from the port B2 diagonally opposite to the port A1. Then the TM-mode light is propagated through the modulated light propagation waveguide 5 and is output from the end 2b.

Similarly, TM-mode light input from the side of the end 2b to the input waveguide 31a of the modulator 30 is modulated. The TM-mode light after modulation which is propagated through the output waveguide 31f is input to the port B1 of the PBC 3 and is output from the port A2 diagonally opposite to the port B1. Then the TM-mode light is propagated through the modulated light propagation waveguide 4. After the TM-mode light reaches the end 2a, the TM-mode light passes through the λ/4 plate 6 located on the end 2a, is reflected from the mirror 7, and passes through the λ/4 plate 6 again. As a result, the TM-mode light is converted into TE-mode light. Then the TE-mode light is propagated through the modulated light propagation waveguide 4, is input to the port A2 of the PBC 3, is output to the port B2 opposite to the port A2, is propagated through the modulated light propagation waveguide 5, and is output from the end 2b.

As a result, the TM-mode light after the modulation and the TE-mode light after the modulation are multiplexed and are output from the end 2b. With the above optical device 40, the two modulators 20 and 30 are located in parallel and output from the one modulator 20 is returned. By doing so, necessary components can be formed on one chip and miniaturization can be realized.

In this example, the bent waveguide 21g is used as a means for returning light output from the modulator 20. However, a mirror or an optical fiber may be used.

Figure 6:
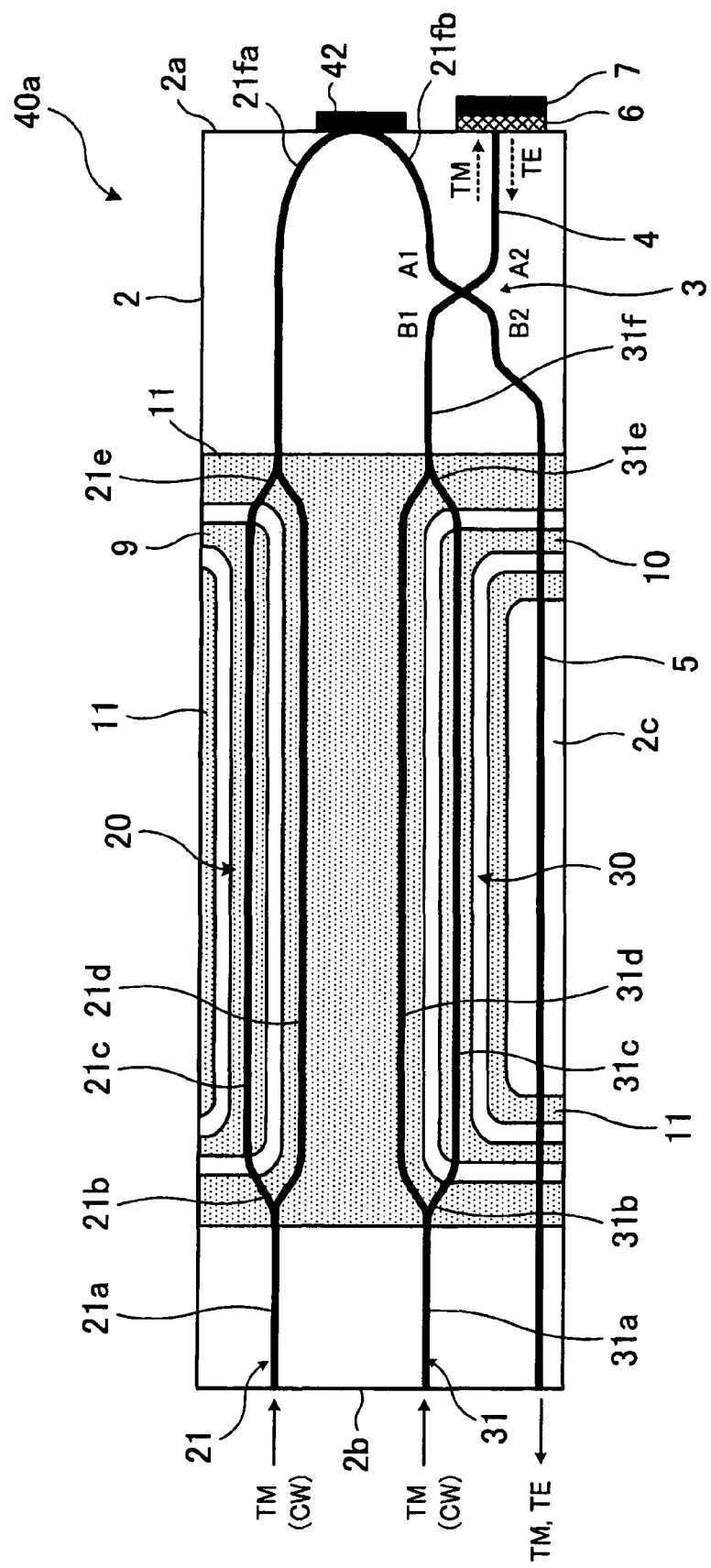
FIG. 6 is a fragmentary schematic plan view showing an example of an optical device having a return structure in which a mirror is used.
Figure 7:
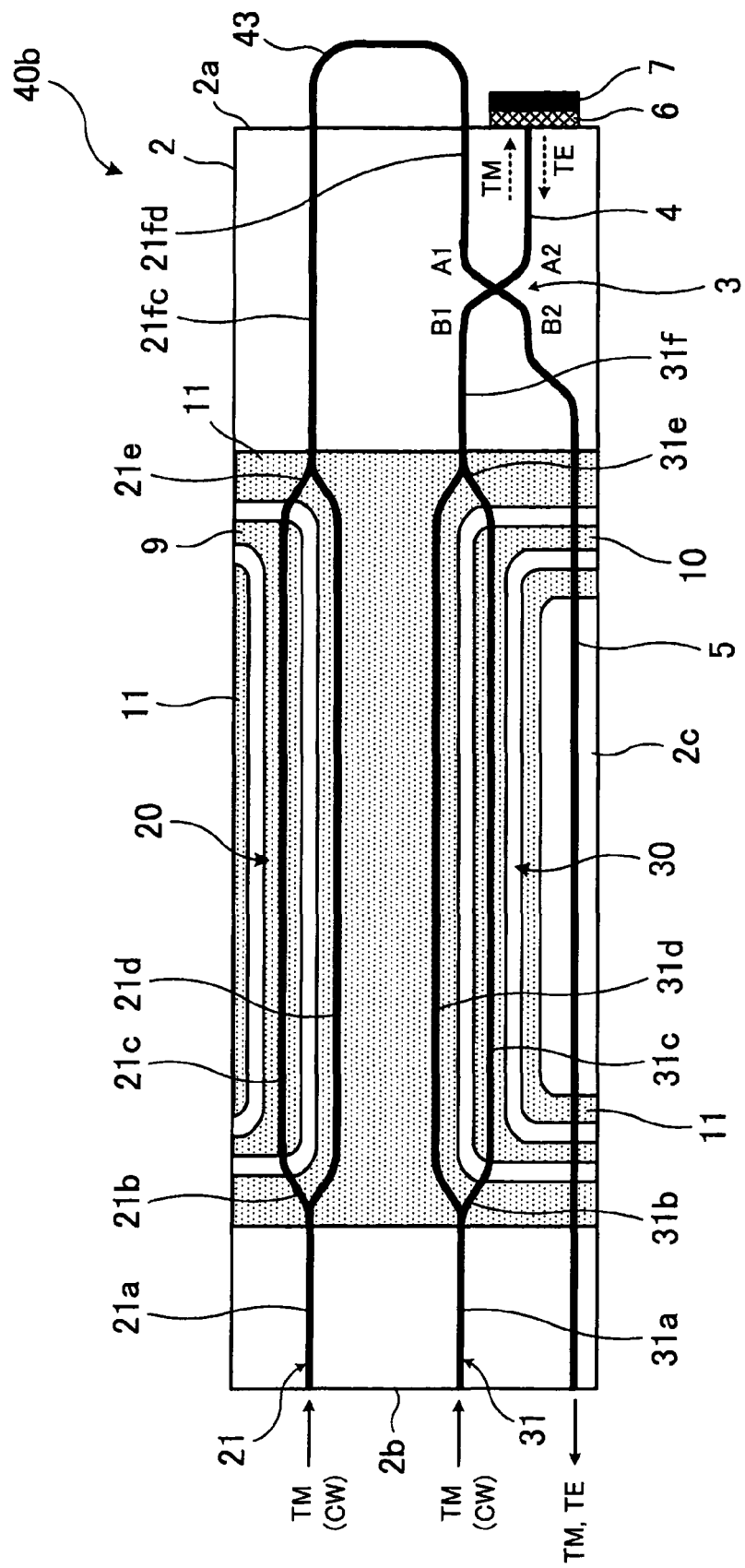
FIG. 7 is a fragmentary schematic plan view showing an example of an optical device having a return structure in which an optical fiber is used.

FIG. 6 is a fragmentary schematic plan view showing an example of an optical device having a return structure in which a mirror is used. FIG. 7 is a fragmentary schematic plan view showing an example of an optical device having a return structure in which an optical fiber is used.

With an optical device 40a shown in FIG. 6, for example, a mirror 42 is located on a portion of an end 2a. Output waveguides 21fa and 21fb for inputting or outputting light are formed so that TM-mode light output from a modulator 20 is input to the mirror 42 at a constant angle and so that the TM-mode light is reflected from the mirror 42 at the constant angle. By doing so, the TM-mode light output from the modulator 20 can be returned.

Furthermore, with an optical device 40b shown in FIG. 7, output waveguides 21fc and 21fd which reach an end 2a are formed and an optical fiber 43 is connected to the output waveguides 21fc and 21fd. By doing so, TM-mode light output from a modulator 20 can be returned.

With the optical devices 40a and 40b, a λ/4 plate 6 and a mirror 7 should be formed on a portion of the end 2a where a modulated light propagation waveguide 4 is exposed.

With the above optical devices 40, 40a, and 40b, the earth electrode 11 is not formed on an area 2c over the modulated light propagation waveguide 5 in order to reduce optical propagation loss caused by the absorption of light by an electrode.

If the area 2c is not secured, the refractive index of the modulated light propagation waveguide 5 should be made lower than that of the other waveguides. By doing so, the absorption of light by the earth electrode 11 can be reduced and optical propagation loss can be reduced. If the refractive index of the modulated light propagation waveguide 5 is lowered, a light trapping effect in the modulated light propagation waveguide 5 is weakened and a region through which light is propagated can be moved in the direction of the depth of the substrate 2. As a result, light becomes distant from the earth electrode 11 and absorption is suppressed.

In addition, if the width of the modulated light propagation waveguide 5 is made narrower than that of the other waveguides, a light trapping effect in the modulated light propagation waveguide 5 is also weakened. As a result, a region through which light is propagated is moved in the direction of the depth of the substrate 2. Therefore, the absorption of light by the earth electrode 11 can be suppressed.

Moreover, by thickening the buffer layer formed between the modulated light propagation waveguide 5 and the earth electrode 11 or lowering the refractive index of the buffer layer, the effect of trapping light propagated through the modulated light propagation waveguide 5 in the substrate 2 by the buffer layer can be enhanced and the absorption of light by the earth electrode 11 can be suppressed.

Not only the method for securing the area over the modulated light propagation waveguide 5 where the earth electrode 11 is not formed but also this method for suppressing the absorption of light by the earth electrode 11 is also applicable to the above optical device 1 according to the first embodiment.

A third embodiment will now be described.

Figure 8:
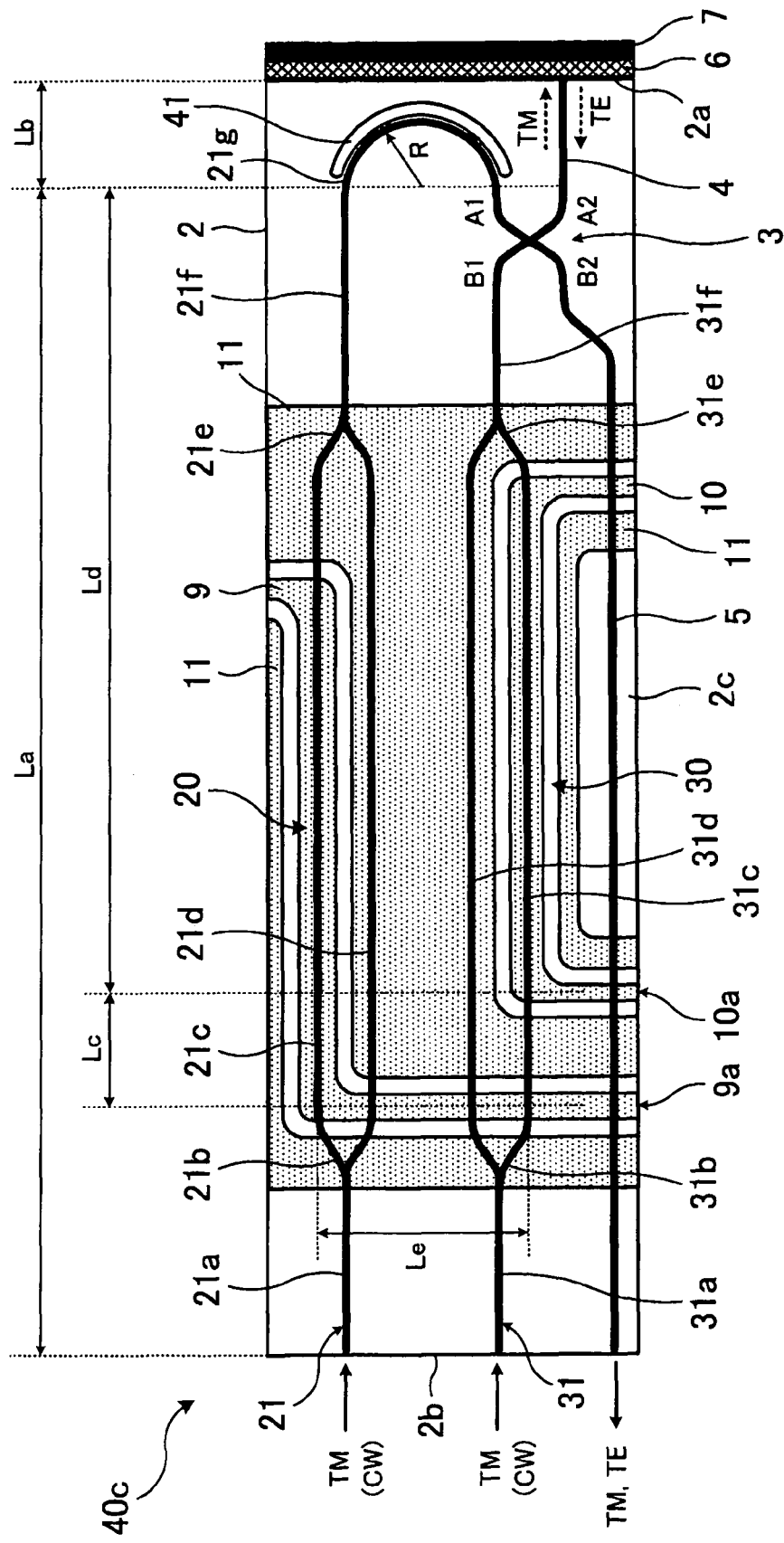
FIG. 8 is a fragmentary schematic plan view showing an example of an optical device according to a third embodiment.

FIG. 8 is a fragmentary schematic plan view showing an example of an optical device according to a third embodiment. Components in FIG. 8 that are the same as or equivalent to those shown in FIG. 1 or 5 are marked with the same symbols.

With an optical device 40c shown in FIG. 8, patterns of signal electrodes 9 and 10 are formed so that input sections 9a and 10a of the signal electrodes 9 and 10 where a modulation signal sent from a signal source is input can be located on the same side. The optical device 40c differs from the above optical device 40 according to the second embodiment in this respect. By adopting this structure, two connectors optically connected to the input sections 9a and 10a from which modulation signals are input can be located at the same side of the optical device 40c. As a result, a package including the optical device 40c can be miniaturized.

By the way, when TM-mode light after modulation and TE-mode light after modulation are multiplexed and are output from an end 2b, it is necessary in some cases to output the TM-mode light and the TE-mode light without any delay between them. Such cases can be dealt with by adjusting the length of a waveguide or an electrode.

Descriptions will now be given with the optical device 40c shown in FIG. 8 as an example. It is assumed that the distance from the end 2b from which the TM-mode light is input to the end of an output waveguide 21f (or to the beginning or end of a bent waveguide 21g or the beginning of a modulated light propagation waveguide 4) is La, that the distance from the beginning of the modulated light propagation waveguide 4 to the end of the modulated light propagation waveguide 4 (end 2a) is Lb, that the distance between the input sections 9a and 10a of modulators 20 and 30 is Lc, that the distance from the input section 10a of the modulator 30 to the end of the output waveguide 21f (or to the beginning or end of the bent waveguide 21g or the beginning of the modulated light propagation waveguide 4) is Ld, that the distance between modulation waveguides 21c and 31c of the modulators 20 and 30 (between the signal electrodes 9 and 10) is Le, that the radius of curvature of the bent waveguide 21g is R, that the refractive indexes of the TM-mode light and the TE-mode light are Ne and No respectively, and that the effective refractive index of a modulation signal is Nm.

Optical length for the TM-mode light from the modulation to the output in the modulator 20 is given by $Ne(Lc+Ld+\pi R+La)$ Optical length for the TM-mode light and the TE-mode light from the modulation to the output in the modulator 30 is given by $Ne(Ld+Lc+(1+No/Ne)(Lb+(No/Ne)La)$ The difference in optical length between modulation signals is given by $NmLe$ To avoid delay between the TM-mode light and the TE-mode light for, for example, a distance of Lb, the length of the modulated light propagation waveguide 4 should be set so that $Lb=(Ne(\pi R+La)-NoLa-NmLe)(No+Ne)$ A fourth embodiment will now be described.

Figure 9:
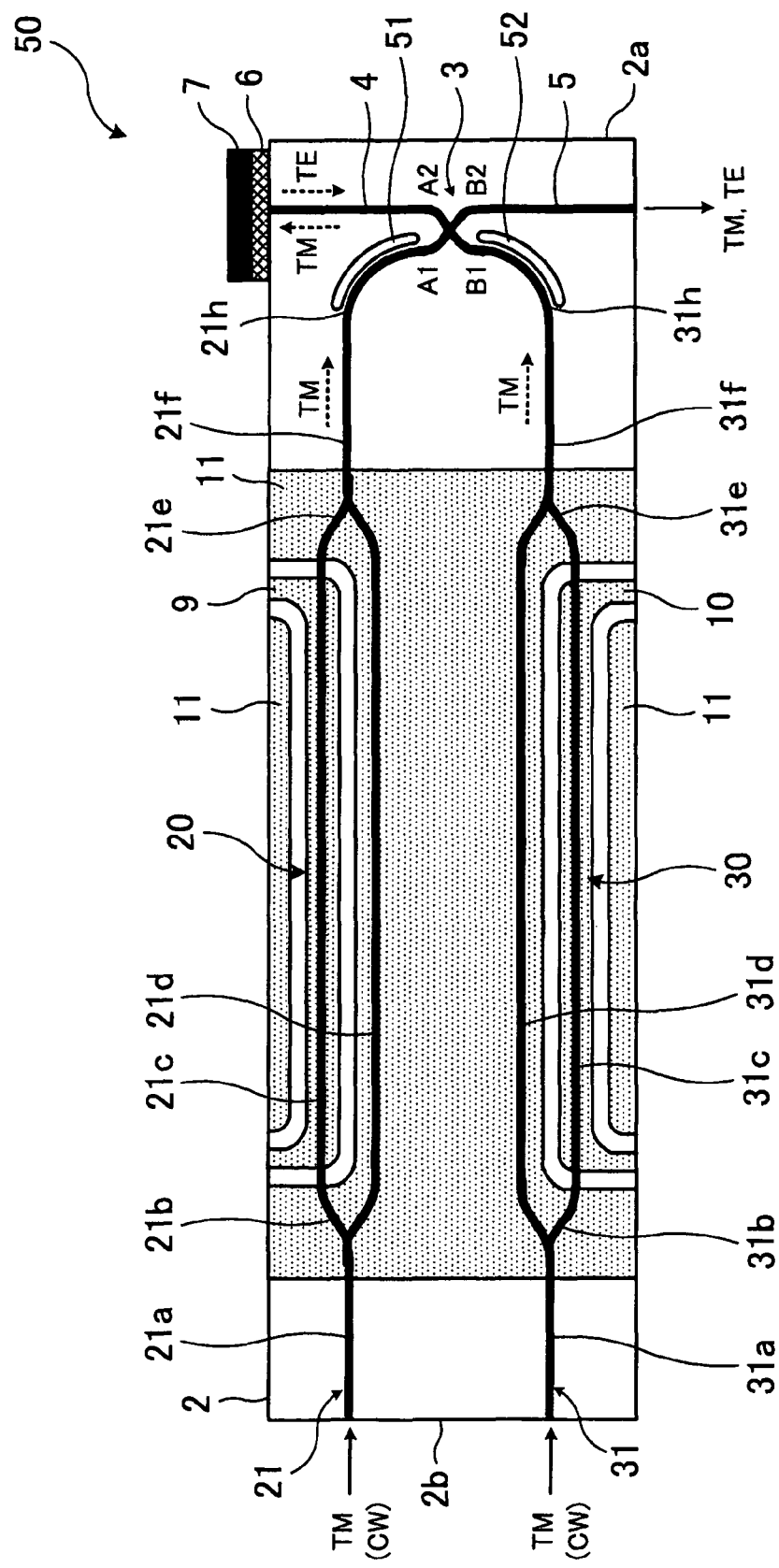
FIG. 9 is a fragmentary schematic plan view showing an example of an optical device according to a fourth embodiment.

FIG. 9 is a fragmentary schematic plan view showing an example of an optical device according to a fourth embodiment. Components in FIG. 9 that are the same as or equivalent to those shown in FIG. 1 or 5 are marked with the same symbols.

With an optical device 50 shown in FIG. 9, a λ/4 plate 6 and a mirror 7 are located on one side end and multiplexed TM-mode light and TE-mode light are output from the other side end.

With the optical device 50, an output waveguide 21f of a modulator 20 is connected to a bent waveguide 21h and the bent waveguide 21h is connected to a port A1 of a PBC 3. An output waveguide 31f of a modulator 30 is connected to a bent waveguide 31h and the bent waveguide 31h is connected to a port B1 of the PBC 3 opposite to the port A1. A shallow groove 51 the depth of which is almost the same as that of the bent waveguide 21h is formed beside the bent waveguide 21h. Similarly, a shallow groove 52 the depth of which is almost the same as that of the bent waveguide 31h is formed beside the bent waveguide 31h. A modulated light propagation waveguide 4 connected to a port A2 of the PBC 3 reaches the one side end of the optical device 50 and a modulated light propagation waveguide 5 connected to a port B2 of the PBC 3 reaches the other side end of the optical device 50. Signal electrodes 9 and 10 and an earth electrode 11 are located over the above structure with a buffer layer between.

TM-mode light modulated by the modulator 20 passes through the PBC 3, is propagated through the modulated light propagation waveguide 5, and is output. TM-mode light modulated by the modulator 30 passes through the PBC 3, is propagated to the λ/4 plate 6 and the mirror 7, is converted into TE-mode light, passes through the PBC 3, is propagated through the modulated light propagation waveguide 5, and is output.

With the optical device 50, an electrode is not located over the modulated light propagation waveguide 5. In addition, compared with, for example, the above optical device 40, the length of the modulated light propagation waveguide 5 is short. As a result, the optical device 50 can be fabricated as one chip and be miniaturized. Moreover, the absorption of the light propagated through the modulated light propagation waveguide 5 by an electrode can be suppressed and optical propagation loss can be reduced.

In this example, the λ/4 plate 6 and the mirror 7 are located on a portion of the one side end where the modulated light propagation waveguide 4 is exposed. However, the λ/4 plate 6 and the mirror 7 may be located on the whole of the one side end.

In addition, for example, if the λ/4 plate 6 and the mirror 7 in particular are located on the whole of the one side end of the optical device 50 according to the fourth embodiment, input sections from which modulation signals are input may be located on the same side. This is the same with the above optical device 40c according to the third embodiment.

A fifth embodiment will now be described.

Figure 10:
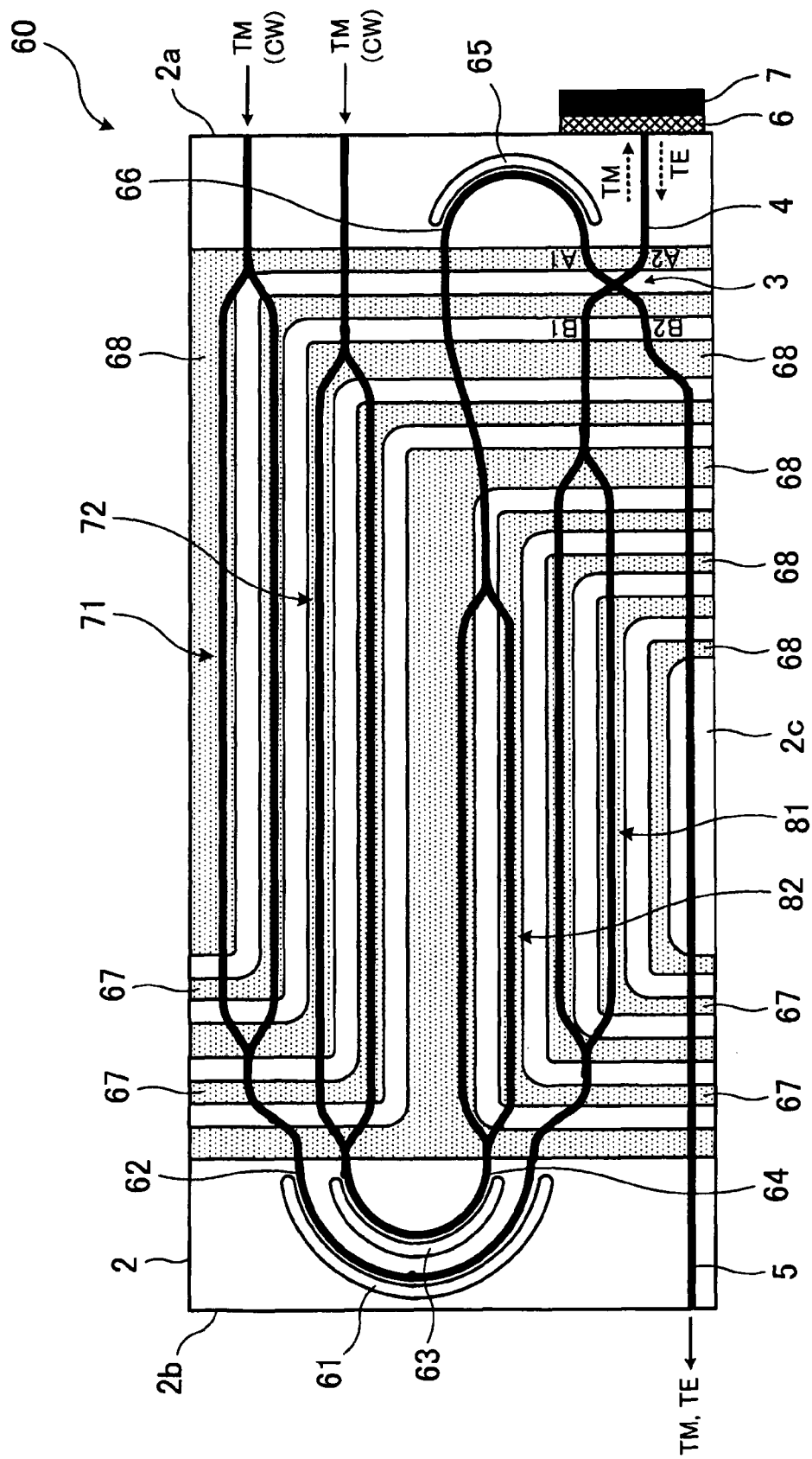
FIG. 10 is a fragmentary schematic plan view showing an example of an optical device according to a fifth embodiment.

FIG. 10 is a fragmentary schematic plan view showing an example of an optical device according to a fifth embodiment. Components in FIG. 10 that are the same as or equivalent to those shown in FIG. 1 or 5 are marked with the same symbols.

An optical device 60 shown in FIG. 10 includes four modulators 71, 72, 81, and 82 and has a multistage structure. The structure of each of the modulators 71, 72, 81, and 82 is the same as that of the above modulator 20 or 30.

In this example, an output side of the modulator 71 is connected to an input side of the modulator 81 via a bent waveguide 62 beside which a groove 61 is formed. An output side of the modulator 72 is connected to an input side of the modulator 82 via a bent waveguide 64 beside which a groove 63 is formed. An output side of the modulator 82 is connected to a port A1 of a PBC 3 via a bent waveguide 66 beside which a groove 65 is formed. An output side of the modulator 81 is connected to a port B1 of the PBC 3 opposite to the port A1.

A modulated light propagation waveguide 4 which reaches an end 2a is connected to a port A2 of the PBC 3. A λ/4 plate 6 and a mirror 7 are located on a portion of the end 2a. A modulated light propagation waveguide 5 which reaches an end 2b is connected to a port B2 of the PBC 3. A signal electrode 67 and an earth electrode 68 are located over the above structure with a buffer layer between.

With the optical device 60 having the above structure, the λ/4 plate 6 and the mirror 7 are located on the end 2a from which TM-mode light is input to the modulators 71 and 72 at a first stage. Therefore, the λ/4 plate 6 and the mirror 7 are formed on a portion of the end 2a where the modulated light propagation waveguide 4 is exposed. By adopting this structure, the miniaturized optical device 60 which includes the modulators 71, 72, 81, and 82 located at multiple stages and which is fabricated as one chip is realized.

A sixth embodiment will now be described.

Figure 11:
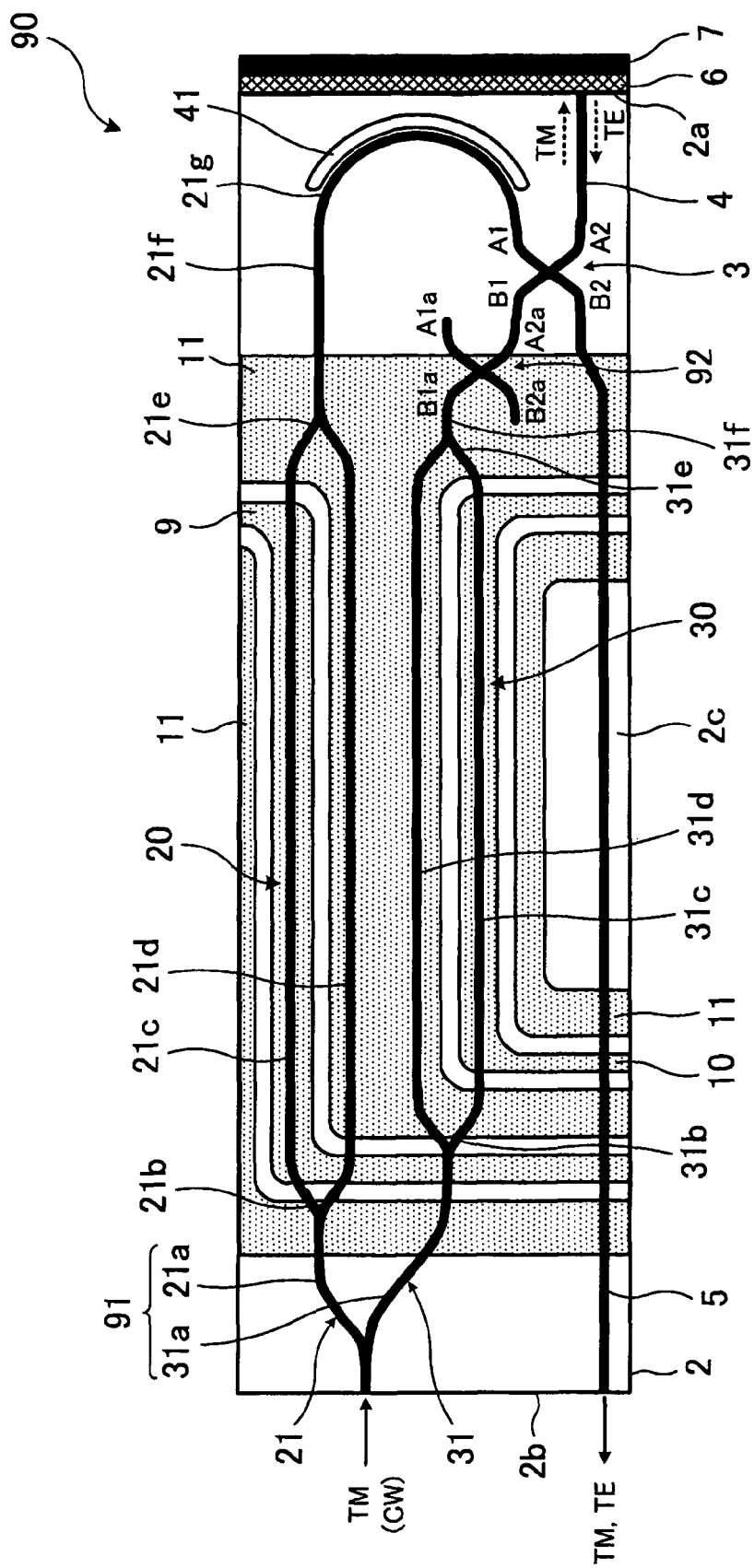
FIG. 11 is a fragmentary schematic plan view showing an example of an optical device according to a sixth embodiment.

FIG. 11 is a fragmentary schematic plan view showing an example of an optical device according to a sixth embodiment. Components in FIG. 11 that are the same as or equivalent to those shown in FIG. 1 or 5 are marked with the same symbols.

With an optical device 90 shown in FIG. 11, input waveguides 21a and 31a of two modulators 20 and 30 from which TM-mode light output from a semiconductor laser or the like is input are considered as a branching waveguide 91. TM-mode light is split in the branching waveguide 91 and is input to the modulators 20 and 30. The optical device 90 also includes a PBC 92 for preventing TE-mode light obtained by making a conversion by the use of a λ/4 plate 6 and a mirror 7 from returning to the modulator 30. The optical device 90 differs from the above optical device 40c according to the third embodiment shown in FIG. 8 in these respects.

With the optical device 90 having the above structure, TM-mode light input from an end 2b may, for example, equally be split by the branching waveguide 91 and be input to the modulators 20 and 30. If TM-mode light and TE-mode light ultimately output from a modulated light propagation waveguide 5 differ in intensity by the influence of, for example, a loss which occurs at the time of being propagated or passing through the λ/4 plate 6, a branching ratio of the branching waveguide 91 may be set so that they will be equal in intensity. In this case, the TM-mode light is split at the set branching ratio in the branching waveguide 91 and is input to the modulators 20 and 30.

For example, the PBC 92 is located so as to connect an output waveguide 31f of the modulator 30 to a port B1a and so as to connect a port A2a diagonally opposite to the port B1a to a port B1 of an other PBC 3. Remaining ports A1a and B2a of the PBC 92 are made open.

The TM-mode light modulated by the modulator 30 is output from the port B1a to the port A2a of the PBC 92, is output from the port B1 to a port A2 of the PBC 3, is propagated through a modulated light propagation waveguide 4, and is converted into TE-mode light by the λ/4 plate 6 and the mirror 7. The TE-mode light is output from the port A2 of the PBC 3 to a port B2 opposite to the port A2. However, part of the TE-mode light may be output to the port B1 diagonally opposite to the port A2, depending on a branching ratio of the PBC 3. The TE-mode light output to the port B1 of the PBC 3 is input to the port A2a of the PBC 92 and is output to the port B2a opposite to the port A2a. If the TE-mode light returns to the modulator 30, the TE-mode light is input to the semiconductor laser or the like which outputs the TM-mode light input to the optical device 90, and the operation of the semiconductor laser or the like is badly affected. With the optical device 90, however, it is difficult to output the TE-mode light which is input to the port A2a to the port B1a of the PBC 92 diagonally opposite to the port A2a. This prevents the operation of the semiconductor laser or the like from being badly affected.

In this example, the two PBCs 3 and 92 are used for preventing the TE-mode light from returning to the modulator 30. However, it is a matter of course that three or more PBCs may be used for preventing the TE-mode light from returning to the modulator 30.

In addition, the branching waveguide 91 described in the sixth embodiment is also applicable to the above optical devices 40, 40a, and 40b according to the second embodiment, the above optical device 50 according to the fourth embodiment, and the above optical device 60 according to the fifth embodiment.

Furthermore, the method of using a plurality of PBCs for preventing the TE-mode light from returning to the modulator 30 described in the sixth is also applicable to the above optical device 1 according to the first embodiment, the above optical devices 40, 40a, and 40b according to the second embodiment, the above optical device 50 according to the fourth embodiment, and the above optical device 60 according to the fifth embodiment.

A seventh embodiment will now be described.

Figure 12:
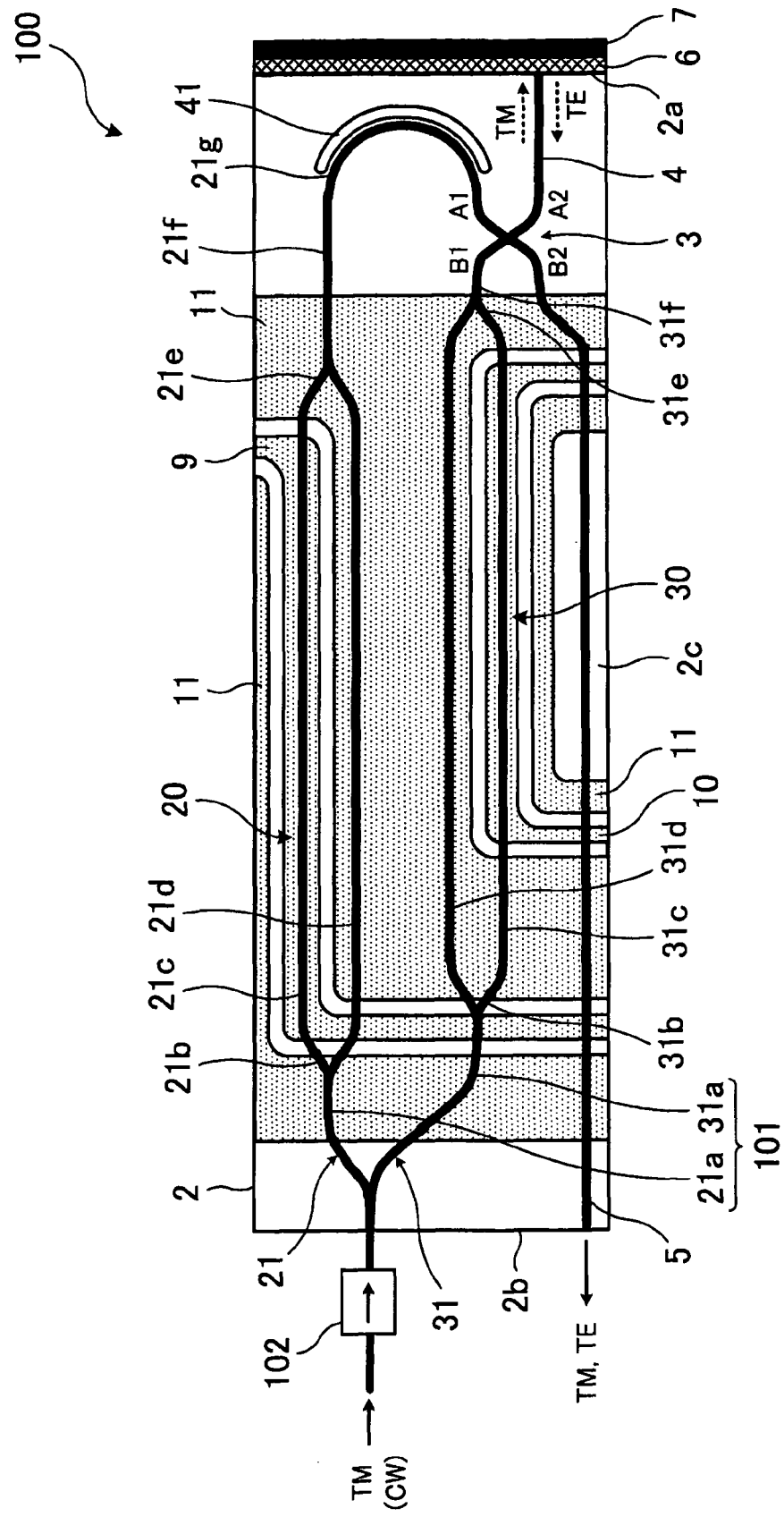
FIG. 12 is a fragmentary schematic plan view showing an example of an optical device according to a seventh embodiment.

FIG. 12 is a fragmentary schematic plan view showing an example of an optical device according to a seventh embodiment. Components in FIG. 12 that are the same as or equivalent to those shown in FIG. 1 or 5 are marked with the same symbols.

With an optical device 100 shown in FIG. 12, input waveguides 21a and 31a of two modulators 20 and 30 from which TM-mode light output from a semiconductor laser or the like is input are considered as a branching waveguide 101. An isolator 102 is located before the branching waveguide 101. The optical device 100 differs from the above optical device 40c according to the third embodiment shown in FIG. 8 in these respects. A branching ratio of the branching waveguide 101 of the optical device 100 can be set. This is the same with the branching waveguide 91 described in the sixth embodiment.

Even if the TM-mode light modulated by the modulator 20 returns to the modulator 30 via a PBC 3 in the optical device 100 or even if the TM-mode light modulated by the modulator 30 returns to the modulator 20 via the PBC 3 in the optical device 100, the isolator 102 prevents the TM-mode light from inputting to the semiconductor laser or the like.

The branching waveguide 101 and the isolator 102 are also applicable to the above optical device 1 according to the first embodiment, the above optical devices 40, 40a, and 40b according to the second embodiment, the above optical device 50 according to the fourth embodiment, and the above optical device 60 according to the fifth embodiment.

In addition, the PBC 92 described in the above sixth embodiment may be located before the PBC 3 on the output side of the modulator 30 in the optical device 100. As a result, the isolator 102 prevents the TM-mode light from returning to the modulator 20 or 30 and a PBC 92 prevents TE-mode light from returning to the modulator 30.

An eighth embodiment will now be described.

Figure 13:
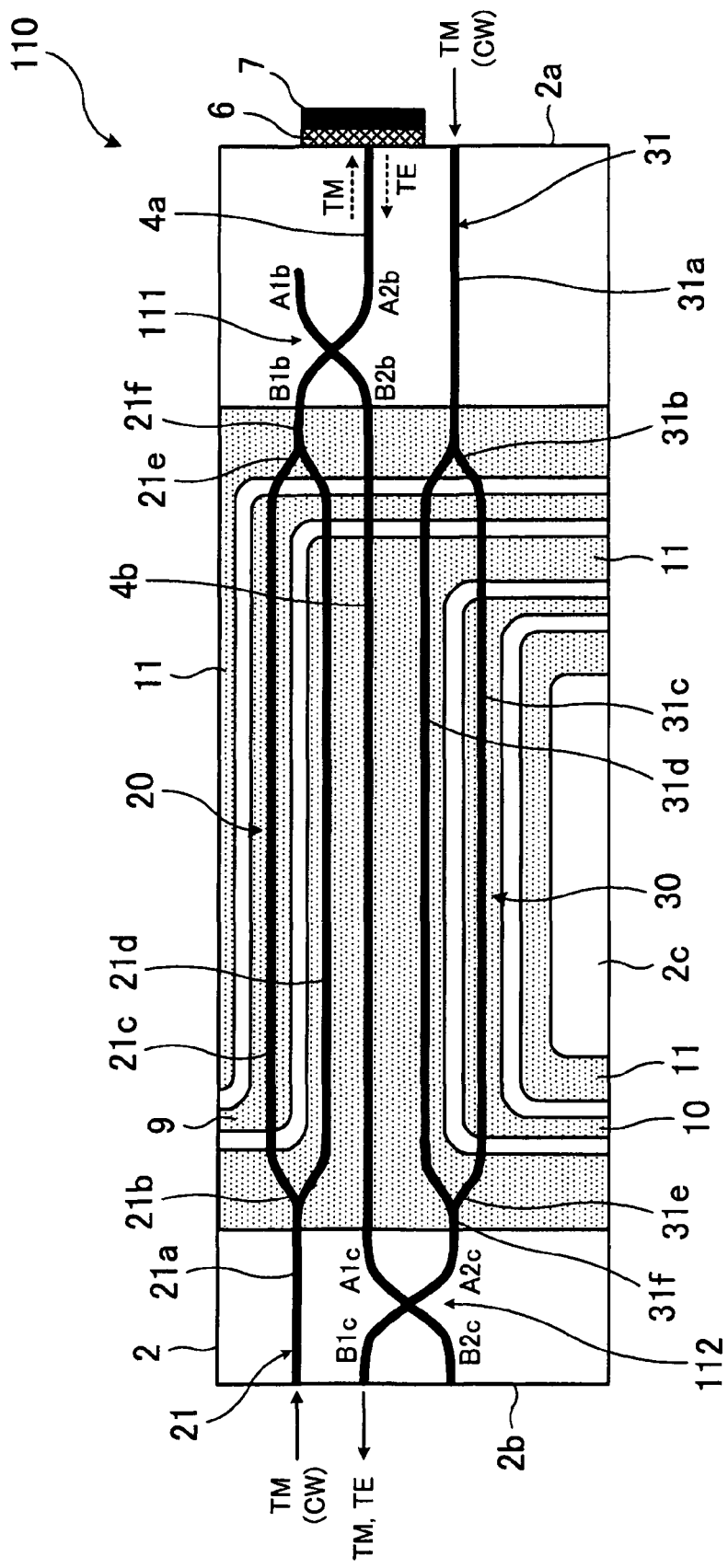
FIG. 13 is a fragmentary schematic plan view showing an example of an optical device according to an eighth embodiment.

FIG. 13 is a fragmentary schematic plan view showing an example of an optical device according to an eighth embodiment. Components in FIG. 13 that are the same as or equivalent to those shown in FIG. 1 or 5 are marked with the same symbols.

With an optical device 110 shown in FIG. 13, TM-mode light is input from an end 2b to a modulator 20 and TM-mode light is input from an end 2a to a modulator 30. A PBC 111 is located on the output side of the modulator 20 and a PBC 112 is located on the output side of the modulator 30.

An output waveguide 21f of the modulator 20 is connected to a port B1b of the PBC 111 and a modulated light propagation waveguide 4a which reaches the end 2a is connected to a port A2b diagonally opposite to the port B1b. A λ/4 plate 6 and a mirror 7 are located on a portion of the end 2a where the modulated light propagation waveguide 4a is exposed. A modulated light propagation waveguide 4b is connected to a port B2b of the PBC 111 and is connected to a port A1c of the other PBC 112. An output waveguide 31f of the modulator 30 is connected to a port A2c of the PBC 112. With the optical device 110, an area over the modulated light propagation waveguide 4b where an earth electrode 11 is not formed may be secured.

With the optical device 110 having the above structure, TM-mode light is input first from a semiconductor laser or the like to the modulators 20 and 30. The TM-mode light modulated by the modulator 20 is input to the port B1b of the PBC 111, is output to the port A2b diagonally opposite to the port B1b, is propagated through the modulated light propagation waveguide 4a, and is converted into TE-mode light by the use of the λ/4 plate 6 and the mirror 7. The TE-mode light is output from the port A2b of the PBC 111 to the port B2b opposite to the port A2b, is propagated through the modulated light propagation waveguide 4b, is input to the port A1c of the PBC 112, and is output from a port B1c opposite to the port A1c. On the other hand, the TM-mode light modulated by the modulator 30 is input to the port A2c of the PBC 112 and is output to the port B1c diagonally opposite to the port A2c. The TM-mode light and the TE-mode light is multiplexed and is output from the port B1c of the PBC 112 in this way.

The optical device 110 effectively prevents the TM-mode light modulated by the modulator 20 or 30 from returning and prevents this TM-mode light from inputting to the semiconductor laser or the like.

With the above-mentioned optical device 1 and the like, certain TM-mode light input is finally output as multiplexed TM-mode light and TE-mode light. In this case, the multiplexed TM-mode light and TE-mode light may differ in propagation loss because of a difference in propagation path. Accordingly, in order to make propagation losses which occur along both propagation paths equal, one of the following methods can be adopted. A portion which differs from the rest in width may be formed on, for example, an input waveguide 21a or 31a or an output waveguide 21f or 31f to increase or decrease a propagation loss which occurs along one propagation path. A shallow groove may be formed beside a portion of a waveguide on one propagation path to control an optical propagation loss. The depth of the groove is almost the same as that of the waveguide. A bent waveguide may be formed as a portion of a waveguide on one propagation path to control an optical propagation loss. A metal film may be formed over a waveguide on one propagation path with a buffer layer between to control an optical propagation loss. The metal film absorbs light.

In the above descriptions, the case where the z-cut substrate 2 is used is taken as an example. However, the above techniques are also applicable to the case where an x-cut substrate is used. In this case, it is necessary to properly change the pattern shape and arrangement of the signal electrodes 9 and 10, the earth electrode 11, and the like.

The above-mentioned techniques are also applicable to optical devices in which various modulation systems, such as a return to zero (RZ) modulation system, a differential quadrature phase shift keying (DQPSK) modulation system, and a RZ-DQPSK modulation system are employed.

As has been described in the foregoing, two modulators and one or more PBCs are arranged in one chip and a polarization mode conversion section is located on an end of the chip. By doing so, a miniature high performance optical device with high reliability which can be fabricated comparatively easily and which has a polarization multiplexing function is realized. In addition, various optical communication units in which such optical devices are used and which have an optical communication function can be realized.

The foregoing is considered as illustrative only of the principles. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical device comprising:
    a coupler formed on a substrate and having first and second ports and third and fourth ports opposite to the first and second ports, respectively, for outputting first-polarization-mode light input from one port to a port diagonally opposite to the one port and for outputting second-polarization-mode light input from one port to a port opposite to the one port;
    a first modulator formed on the substrate and including a first optical waveguide connected to the first port for modulating first-polarization-mode light input to the first optical waveguide and for outputting the modulated first-polarization-mode light to the first port;
    a second modulator formed on the substrate and including a second optical waveguide connected to the third port for modulating first-polarization-mode light input to the second optical waveguide and for outputting the modulated first-polarization-mode light to the third port; and
    a polarization mode conversion section for converting the first-polarization-mode light which is input from the second modulator to the third port and which is output to the second port diagonally opposite to the third port into second-polarization-mode light and for returning the second-polarization-mode light to the second port.

2. The optical device according to claim 1, wherein:
    the polarization mode conversion section includes a $\lambda/4$ plate and a mirror; and
    the first-polarization-mode light output from the second port is converted into the second-polarization-mode light while the first-polarization-mode light passes through the $\lambda/4$ plate, is reflected from the mirror, and passes through the $\lambda/4$ plate again.

3. The optical device according to claim 1, wherein the first modulator and the second modulator are arranged on sides of the first and third ports, respectively, opposite to each other with the coupler between so that the first modulator and the second modulator output light to the first and third ports, respectively, opposite to each other.

4. The optical device according to claim 1, wherein the first modulator and the second modulator are arranged in parallel so that the first modulator and the second modulator output light in a same direction.

5. The optical device according to claim 4, further comprising a return section for returning the light output from the first modulator in an opposite direction, wherein the coupler is arranged so that the light output from the first modulator is returned in the return section and is input to the first port and so that the light output from the second modulator is input straightly to the third port.

6. The optical device according to claim 5, wherein the return section is a bent waveguide through which the light output from the first modulator is curvedly propagated so as to be returned in the opposite direction.

7. The optical device according to claim 4, wherein:
    the first optical waveguide includes a first bent waveguide through which the light output from the first modulator is curvedly propagated to a side of the second modulator arranged in parallel with the first modulator;
    the second optical waveguide includes a second bent waveguide through which the light output from the second modulator is curvedly propagated to a side of the first modulator arranged in parallel with the second modulator; and
    the coupler is arranged so that light output from the first bent waveguide is input straightly to the first port and so that light output from the second bent waveguide is input straightly to the third port.

8. The optical device according to claim 4, further comprising a branching waveguide formed on the substrate for splitting the first-polarization-mode light input from one direction in two directions of the first optical waveguide and the second optical waveguide.

9. The optical device according to claim 1, further comprising first and second input sections for inputting an electrical signal for optical modulation to be applied to the first optical waveguide and the second optical waveguide, wherein the first and second input sections are located on a same end of the substrate.

10. The optical device according to claim 1, further comprising one or more couplers arranged between the second modulator and the coupler for preventing light from returning.

11. The optical device according to claim 1, further comprising an isolator which is arranged before the first optical waveguide and the second optical waveguide and through which light input from one direction is propagated only in a direction of the first optical waveguide and the second optical waveguide.

12. The optical device according to claim 1, further comprising:
    a third optical waveguide which is formed on the substrate and through which light output from the fourth port is propagated to an outside of the substrate; and
    electrodes formed over the substrate with a buffer layer between for applying an electrical signal for optical modulation to the first optical waveguide and the second optical waveguide,
    wherein the third optical waveguide is formed so that a whole or part of the third optical waveguide is arranged under a region where the electrodes are not formed.

13. The optical device according to claim 1, further comprising a third optical waveguide which is formed on the substrate and through which light output from the fourth port is propagated to an outside of the substrate, wherein a whole or part of the third optical waveguide differs from waveguides other than the third optical waveguide in refractive index or width.

14. The optical device according to claim 1, further comprising:
    a third optical waveguide which is formed on the substrate and through which light output from the fourth port is propagated to an outside of the substrate; and
    electrodes formed over the substrate with a buffer layer between for applying an electrical signal for optical modulation to the first optical waveguide and the second optical waveguide, wherein a whole or part of a buffer layer formed over the third optical waveguide differs from a buffer layer except over the third optical waveguide in thickness or refractive index.

15. The optical device according to claim 1, wherein a portion of the first optical waveguide through which the light before and after the modulation is propagated differs from a portion of the second optical waveguide through which the light before and after the modulation is propagated in width.

16. The optical device according to claim 1, wherein a groove is formed on the substrate beside one of a portion of the first optical waveguide through which the light before and after the modulation is propagated and a portion of the second optical waveguide through which the light before and after the modulation is propagated.

17. The optical device according to claim 1, wherein a bent waveguide through which light is curvedly propagated is formed on one of a portion of the first optical waveguide through which the light before and after the modulation is propagated and a portion of the second optical waveguide through which the light before and after the modulation is propagated.

18. The optical device according to claim 1, wherein a metal film is formed over one of a portion of the first optical waveguide through which the light before and after the modulation is propagated and a portion of the second optical waveguide through which the light before and after the modulation is propagated.

19. An optical device comprising:
a first coupler formed on a substrate and having first and second ports and third and fourth ports opposite to the first and second ports, respectively, for outputting first-polarization-mode light input from one port to a port diagonally opposite to the one port and for outputting second-polarization-mode light input from one port to a port opposite to the one port;
a second coupler formed on the substrate and having fifth and sixth ports and seventh and eighth ports opposite to the fifth and sixth ports, respectively, for outputting first-polarization-mode light input from one port to a port diagonally opposite to the one port and for outputting second-polarization-mode light input from one port to a port opposite to the one port;
a first modulator formed on the substrate and including a first optical waveguide connected to the first port for modulating first-polarization-mode light input to the first optical waveguide and for outputting the modulated first-polarization-mode light to the first port;
a polarization mode conversion section for converting the first-polarization-mode light which is input from the first modulator to the first port and which is output to the fourth port diagonally opposite to the first port into second-polarization-mode light and for returning the second-polarization-mode light to the fourth port; and
a second modulator formed on the substrate and including a second optical waveguide connected to the fifth port for modulating first-polarization-mode light input to the second optical waveguide and for outputting the modulated first-polarization-mode light to the eighth port,
wherein:
the second port and the sixth port are connected; and
the second-polarization-mode light after the conversion returned to the fourth port by the polarization mode conversion section is output to the second port opposite to the fourth port, is input to the sixth port, and is output to the eighth port opposite to the sixth port.

20. An optical device comprising:
a first modulator for independently modulating first light having a first predetermined polarization mode;
a second modulator for independently modulating second light having a second predetermined polarization mode; and
a polarization beam coupler having a first port, a second port, a third port, and a fourth port; the polarization beam coupler for inputting the first light from the first modulator via the first port, inputting the second light from the second modulator via the second port, outputting the first light via the third port and inputting reflected and polarization converted light on the first light by a wave plate and a mirror, and outputting the first light having the converted polarization mode and the second light having the predetermined polarization mode via the fourth port.

* * * * *